A. G. Batchelder,
Apple Parer.
No. 3,970. Reissued May 17, 1870.
Fig: 1.
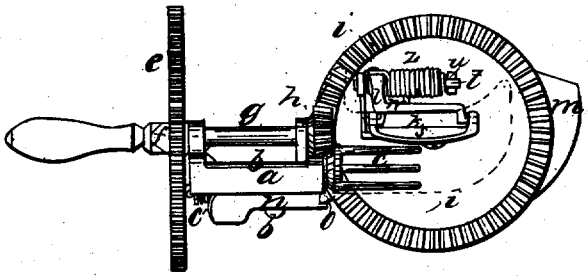
Fig: 2.
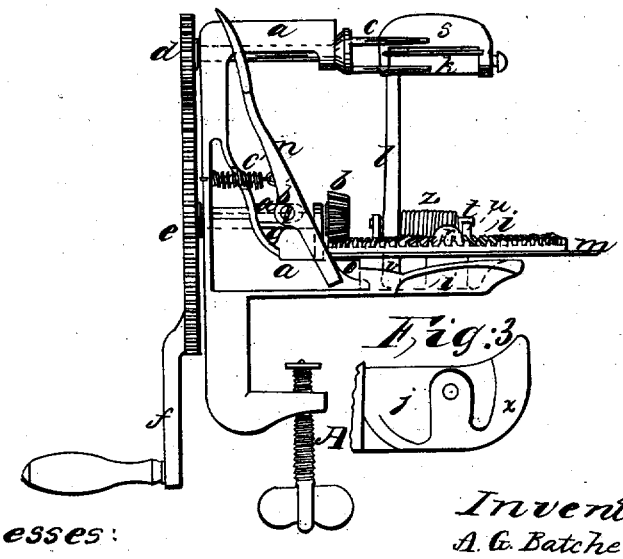
Fig: 4.
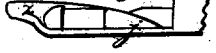
Fig: 3
Witnesses:
S. N. Piper
J. A. Snow,
Inventor:
A. G. Batchelder
by his attorney
M. H. Eddy
N. PETERS, PHOTO-LITHOGRAPHER, WASHINGTON, D. C.

UNITED STATES PATENT OFFICE.

ASAHEL G. BATCHELDER, OF LOWELL, MASSACHUSETTS.

IMPROVED APPLE-PARER.

Specification forming part of Letters Patent No. 87,322, dated March 2, 1869; Reissue No. 3,970, dated May 17, 1870.

*To all whom it may concern:*

Whereas Letters Patent No. 87,322, dated March 2, 1869, have been granted to the undersigned, ASAHEL G. BATCHELDER, of Lowell, of the county of Middlesex and State of Massachusetts, for a new and useful Improvement in Apple-Parers, and the undersigned has applied for a reissue thereof; now, therefore, be it known that the invention of the undersigned is fully described as follows, and represented in the accompanying drawings.

The purpose of the mechanism which I have applied to a paring-machine is to effect automatically the removal of an apple or vegetable from the fork or rotary carrier of the machine immediately after such apple or vegetable may have been pared by the paring-knife of such machine.

To enable persons skilled in the construction or use of apple-parers to comprehend and employ my invention, I will now proceed to describe it and the method of its operation.

Of the drawings hereinbefore mentioned, Figure 1 denotes a top view, and Fig. 2 a front elevation, of an apple-paring machine embodying my said invention, the nature or principle of which consists, mainly, in a combination consisting not only of a mechanism for paring an apple or vegetable, but of mechanism for effecting the discharge of it from the rotary fork or carrier of the paring mechanism immediately after the paring of such apple or vegetable may have been accomplished, the discharging mechanism thus superseding the necessity of a removal of the pared fruit or vegetable by the hand alone of the attendant on the machine.

In the paring-machine as exhibited in the said drawings, *a* denotes the frame for supporting the main operative parts. At the upper portion of such frame there is a rotary shaft, *b*, supported in suitable bearings. Such shaft has at one end of it a fork or carrier, *c*, and at its other end a pinion, *d*. The said pinion engages with a gear, *e*, furnished with a crank, *f*, and fastened on the outer end of a driving-shaft, *g*, duly supported in bearings, and having a beveled pinion, *h*, fixed on it at its inner end. This pinion *h* engages with a "table-gear" or beveled toothed wheel, *i*, supported by and capable of revolving on a pivot, *r*, extended upward from the arm or base part *j* of the frame.

A lever, *l*, carrying a stock, *s*, (which is pivoted to the upper part of such lever, and furnished with a paring-knife, *k*,) has its fulcrum *t* supported in bearings *u u*, raised on the wheel *i*, the shorter arm *v* of the lever being extended down through an opening, *w*, made through the said wheel.

There is a cam, *x*, formed on and projected from the base-plate *j*, a top view of such base part and the said cam being represented in Fig. 3, and a rear side elevation of them in Fig. 4. Furthermore, a helical spring, *z*, coiled around the fulcrum of the lever *l*, is fastened at one extremity to the lever, and at the other to the wheel *i*, such spring serving to press the upper arm of the lever toward the fork.

A clamp-screw, A, arranged on the lower part of the frame *a* in manner as represented in the drawings, serves to aid in securing the frame to a bench or table, as occasion may require.

The above-described mechanism, irrespective of the clamp-screw, constitutes a machine for paring an apple or vegetable. To such machine I have added mechanism for discharging the pared fruit from the carrier or fork. This additional mechanism may be thus described: There is affixed to the wheel *i*, or extended from it, a cam, *m*, formed and arranged as represented. Furthermore, there is pivoted to the frame *a*, or an arm, *a'*, extended therefrom, a lever, *n*. The pivot or fulcrum of the said lever is shown at *b'*, and the lever is extended both above and below its fulcrum, and with respect to the fork *c* and the wheel *i*, in manner as represented. Above the said fulcrum a spring, *c'*, at one end is attached to the lever and at the other to the frame *a*, such spring being disposed as shown in Fig. 2.

The operation of the machine constructed in manner as described may be thus explained: The attendant having fastened the machine to a bench or table by means of the clamp-screw should press on the fork or rotary-carrier *c* an apple or vegetable to be pared, the same being so as to cause the prongs of the fork to enter the fruit or vegetable, and thus couple it with or fix it to the carrier. This having been accomplished, the attendant should lay hold of the crank *f* and put in revolution the shaft *g* and its gears, thereby causing not only the revolution of the fork with the fruit thereon, but at the same time putting the wheel *i* in revolution. During each entire revolution of the wheel *i* the knife will be carried partly around the fruit, sufficiently to effect the paring of it, after which the lower arm of the lever *l* will be carried against the cam *x*, by which, during the remainder of the revolution of the wheel or table-gear *i*, the lever will be moved and supported, so as to be out of the way of the apple or fruit while the latter may be in the act of being discharged from the fork. During this latter half of the revolution of the wheel *i*, and at a proper time, the cam *m* will be caused to actuate the lever *n* in such manner as to force it against the apple, so as to crowd it off the carrier, the lever afterward being brought back against a rest or stop, *o*, by the spring *c'* in time to be out of the way of the knife-stock preparatory to it being carried around underneath the shaft of the carrier, which will next take place. Immediately after the discharge of the apple from the fork the attendant is to put thereon another apple, which by the operation of the machine will next be pared and discharged, the operator continuing to turn the crank and supply the machine with apples as fast as may be required.

I claim—

1. The combination of the lever *n*, the cam *m*, and the spring *c'*, or the mechanical equivalent or equivalents thereof, with mechanism, substantially as described, or its equivalent, for paring an apple or vegetable.

2. The arrangement of the lever *n* and the cam *m* with the table-gear *i*, the frame *a*, and the rotary fork *c*, the whole being substantially as hereinbefore explained, and as represented.

ASAHEL G. BATCHELDER.

Witnesses:
R. H. EDDY,
S. N. PIPER.